United States Patent
Weerasooriya et al.

(10) Patent No.: US 7,843,662 B1
(45) Date of Patent: Nov. 30, 2010

(54) SERVOING ON CONCENTRIC SERVO SECTORS OF A FIRST DISK SURFACE TO WRITE A SPIRAL SERVO TRACK TO A SECOND DISK SURFACE

(75) Inventors: Siri S. Weerasooriya, Campbell, CA (US); Wing Ying, Fremont, CA (US); Brian P. Rigney, Louisville, CO (US)

(73) Assignee: Western Digital Technologies, Inc., Lake Forest, CA (US)

( * ) Notice: Subject to any disclaimer, the term of this patent is extended or adjusted under 35 U.S.C. 154(b) by 136 days.

(21) Appl. No.: 12/136,207

(22) Filed: Jun. 10, 2008

(51) Int. Cl.
*G11B 5/596* (2006.01)
(52) U.S. Cl. .................................................. 360/78.14
(58) Field of Classification Search ............... 360/78.14, 360/77.04, 75, 77.08, 77.01, 48, 55, 51; 369/275.3
See application file for complete search history.

(56) References Cited

U.S. PATENT DOCUMENTS

| | | | |
|---|---|---|---|
| 4,107,746 A * | 8/1978 | Conway | 360/78.14 |
| 5,668,679 A | 9/1997 | Swearingen et al. | |
| 5,815,485 A * | 9/1998 | Tanaka et al. | 369/275.3 |
| 6,091,564 A * | 7/2000 | Codilian et al. | 360/75 |
| 6,344,942 B1 | 2/2002 | Yarmchuk | |
| 6,411,459 B1 | 6/2002 | Belser et al. | |
| 6,519,107 B1 | 2/2003 | Ehrlich et al. | |
| 6,631,046 B2 | 10/2003 | Szita et al. | |
| 6,934,112 B2 | 8/2005 | Ono et al. | |
| 6,954,318 B2 | 10/2005 | Sato et al. | |
| 6,977,791 B2 | 12/2005 | Zhu et al. | |
| 6,992,848 B1 | 1/2006 | Agarwal et al. | |
| 7,016,132 B2 | 3/2006 | Sato et al. | |
| 7,057,842 B2 | 6/2006 | Chung et al. | |
| 7,088,533 B1 | 8/2006 | Shepherd et al. | |
| 7,113,362 B1 | 9/2006 | Lee et al. | |
| 7,116,511 B2 | 10/2006 | Ehrlich | |
| 7,133,233 B1 | 11/2006 | Ray et al. | |
| 7,133,239 B1 * | 11/2006 | Hartman et al. | 360/75 |
| 7,133,240 B2 | 11/2006 | Ehrlich et al. | |
| 7,139,144 B1 * | 11/2006 | Hartman et al. | 360/51 |
| 7,158,330 B2 | 1/2007 | Morris et al. | |
| 7,206,157 B2 | 4/2007 | Ehrlich | |
| 7,212,369 B1 | 5/2007 | Levy et al | |
| 7,230,789 B1 | 6/2007 | Brunnett et al. | |
| 7,301,717 B1 | 11/2007 | Lee et al. | |
| 7,307,807 B1 | 12/2007 | Han et al. | |
| 7,312,943 B2 | 12/2007 | Lau et al. | |
| 7,333,286 B2 | 2/2008 | Jung et al. | |
| 7,433,143 B1 * | 10/2008 | Ying et al. | 360/51 |
| 7,499,234 B1 * | 3/2009 | Rigney et al. | 360/75 |
| 7,505,223 B1 * | 3/2009 | McCornack | 360/75 |

(Continued)

*Primary Examiner*—Fred Tzeng (57) ABSTRACT

A disk drive is disclosed comprising a first disk surface and a second disk surface, wherein the first disk surface comprises a plurality of concentric servo sectors extending across substantially an entire radius of the first disk surface. The concentric servo sectors are read across substantially the entire radius of the first disk surface using the first head to generate a read signal. The read signal is processed to generate a position error signal (PES) representing a radial location of the first head relative to the first disk surface. The PES is processed to generate a control signal applied to the VCM to move the second head radially over the second disk surface while writing a spiral servo track on the second disk surface.

20 Claims, 11 Drawing Sheets

U.S. PATENT DOCUMENTS

| | | |
|---|---|---|
| 7,561,359 B1 * | 7/2009 | Jeong et al. .................... 360/48 |
| 2003/0086196 A1 | 5/2003 | Morris |
| 2003/0099050 A1 | 5/2003 | Kitagawa |
| 2004/0160696 A1 | 8/2004 | Meyer |
| 2007/0047132 A1 * | 3/2007 | Sado et al. ............... 360/77.01 |
| 2007/0081268 A1 | 4/2007 | Jung et al. |
| 2007/0195450 A1 | 8/2007 | Rutherford |
| 2007/0211367 A1 | 9/2007 | Lau et al. |
| 2007/0211369 A1 | 9/2007 | Yang et al. |
| 2008/0002279 A1 | 1/2008 | Kouhara et al. |
| 2008/0239556 A1 * | 10/2008 | Wiseman et al. ......... 360/77.08 |
| 2009/0086357 A1 * | 4/2009 | Ehrlich ........................ 360/55 |

* cited by examiner

SERVOING ON CONCENTRIC SERVO SECTORS OF A FIRST DISK SURFACE TO WRITE A SPIRAL SERVO TRACK TO A SECOND DISK SURFACE

BACKGROUND

Figure 1:
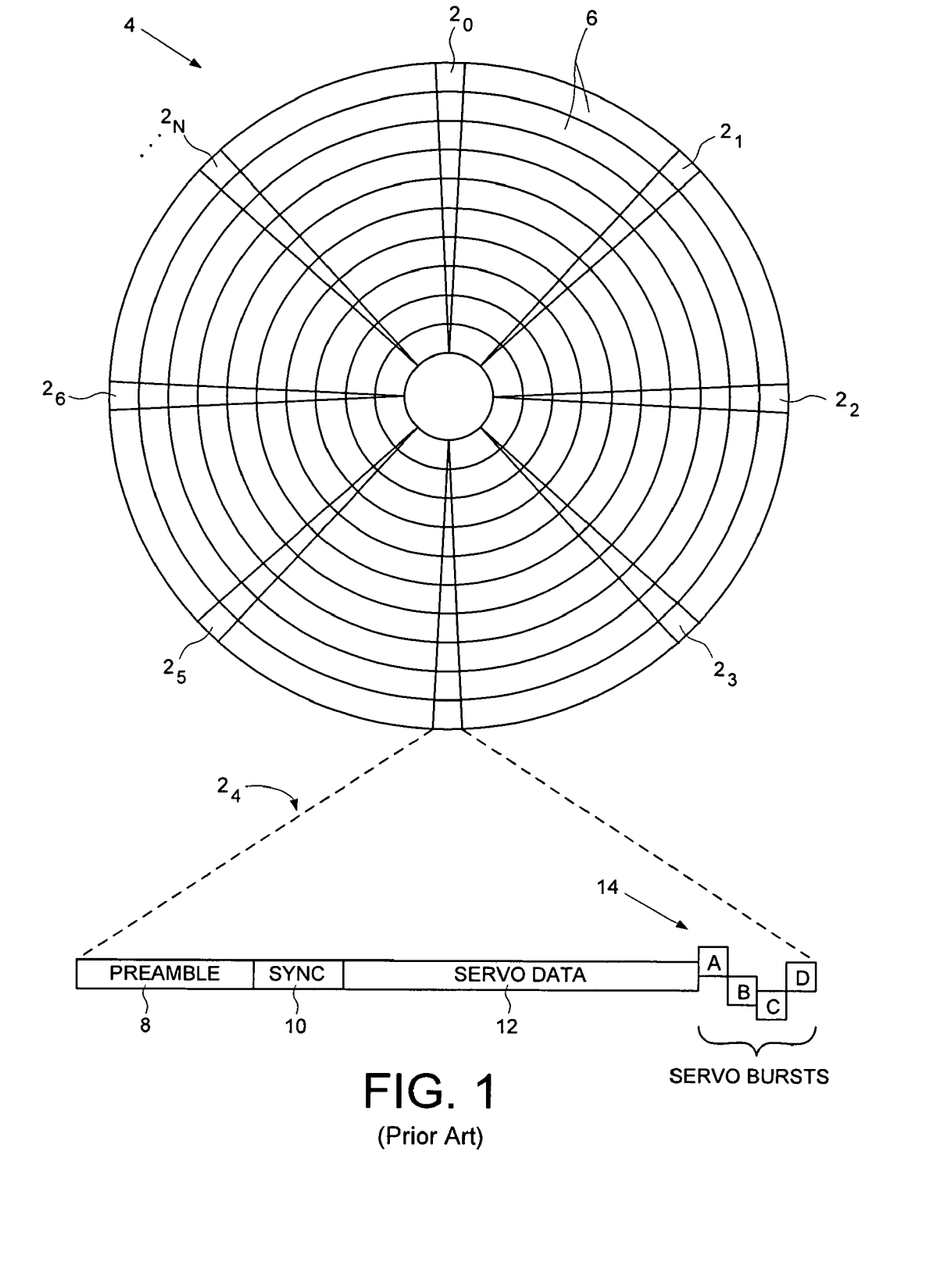
FIG. 1 shows a prior art disk format comprising a plurality of data tracks defined a plurality of embedded servo sectors.

When manufacturing a disk drive, concentric servo sectors $2_0$-$2_N$ are written to a disk 4 which define a plurality of radially-spaced, concentric data tracks 6 as shown in the prior art disk format of FIG. 1. Each data track 6 is partitioned into a plurality of data sectors wherein the concentric servo sectors $2_0$-$2_N$ are considered "embedded" in the data sectors. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target track during a seek operation, and the servo bursts 14 are processed to maintain the head over a centerline of the target track while writing or reading data during a tracking operation.

In the past, external servo writers have been used to write the concentric servo sectors $2_0$-$2_N$ to the disk surface during manufacturing. External servo writers employ extremely accurate head positioning mechanics, such as a laser interferometer, to ensure the concentric servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the concentric servo sectors independent of an external servo writer. For example, U.S. Pat. No. 5,668,679 teaches a disk drive which performs a self-servo writing operation by writing a plurality of spiral servo tracks to the disk which are then processed to write the concentric servo sectors along a circular path. Each spiral servo track is written to the disk as a high frequency signal (with missing bits), wherein the position error signal (PES) for tracking is generated relative to time shifts in the detected location of the spiral servo tracks. The read signal is rectified and low pass filtered to generate a triangular envelope signal representing a spiral servo track crossing, wherein the location of the spiral servo track is detected by detecting a peak in the triangular envelope signal relative to a clock synchronized to the rotation of the disk.

The spiral servo tracks in the '679 patent are written by the control circuitry within each disk drive by controlling the velocity of the head open loop (no feedback during the constant velocity segment of the velocity profile). However, controlling the velocity of the actuator arm open loop means that the actual velocity of the head relative to the disk will vary while writing each spiral servo track, as well as vary between each spiral servo track. The velocity errors when writing each spiral servo track leads to tracking and timing errors when writing the concentric servo sectors.

DETAILED DESCRIPTION OF EMBODIMENTS OF THE INVENTION

Figure 2:
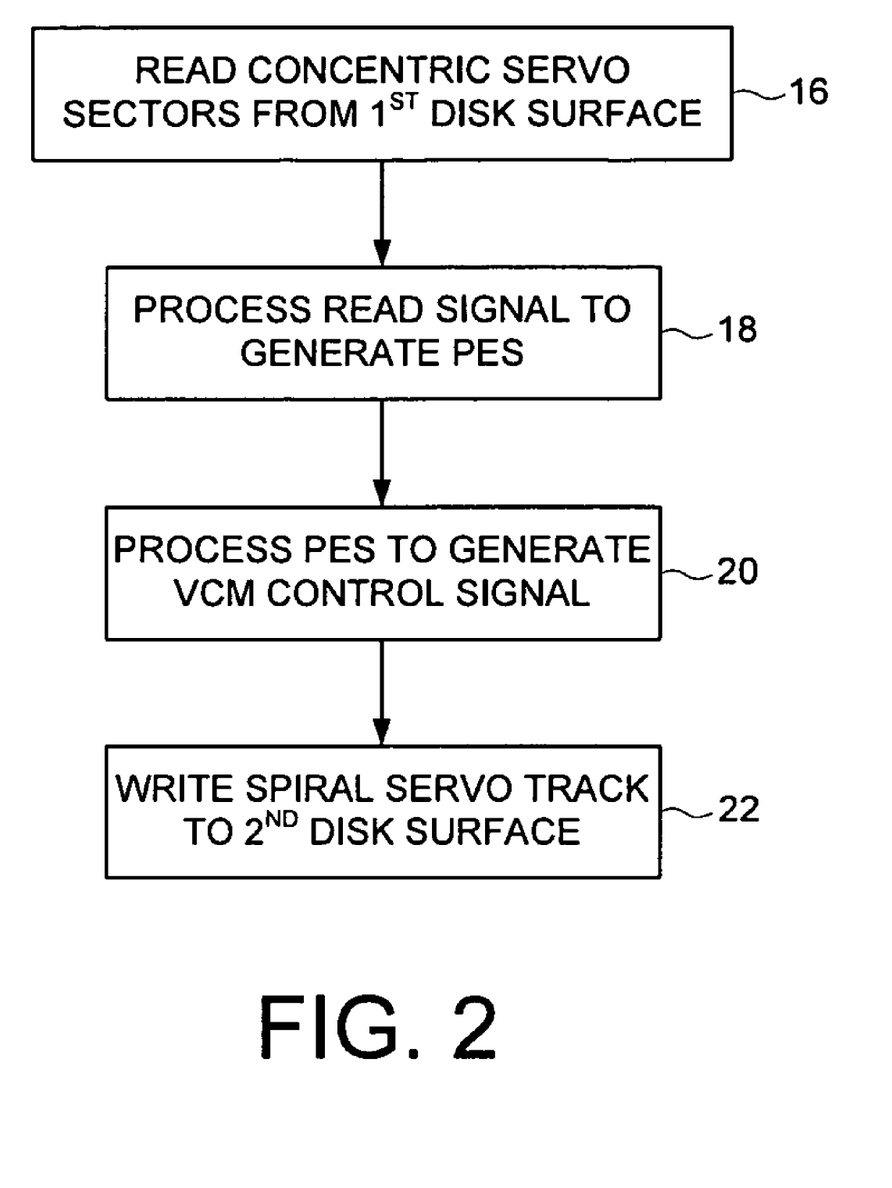
FIG. 2 is a flow diagram according to an embodiment of the present invention wherein concentric servo sectors on a first disk surface are processed to write spiral servo tracks to a second disk surface.

FIG. 2 is a flow diagram according to an embodiment of the present invention. Concentric servo sectors are read across substantially the entire radius of a first disk surface using a first head to generate a read signal (step 16). The read signal is processed to generate a position error signal (PES) representing a radial location of the first head relative to the first disk surface (step 18). The PES is processed to generate a control signal applied to the VCM to move a second head radially over a second disk surface (step 20) while writing a spiral servo track on the second disk surface (step 22).

Figure 3A:
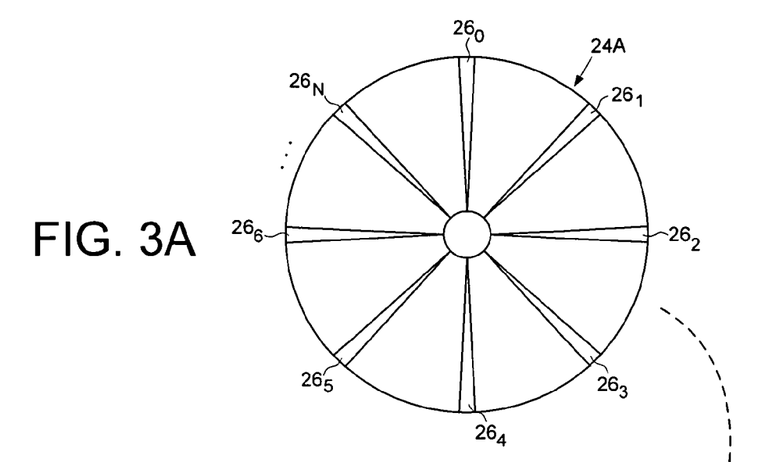
FIGS. 3A-3C illustrate the flow diagram of FIG. 2.
Figure 3B:
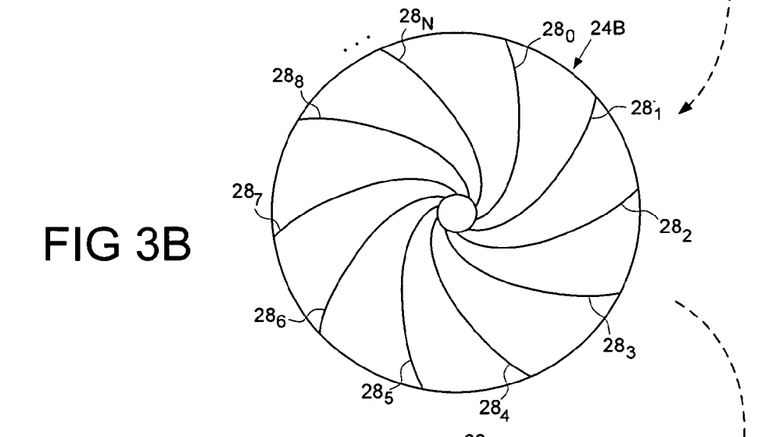

FIG. 3A illustrates an embodiment of the present invention wherein a first disk surface 24A comprises a plurality of concentric servo sectors $26_0$-$26_N$ forming wedges from the inner to outer diameter of the disk. The concentric servo sectors $26_0$-$26_N$ are read in order to servo a first head radially over the first disk surface at a predetermined velocity while a second head writes a spiral servo track $28_i$ to a second disk surface 24B. This process is repeated in order to write a plurality of spiral servo tracks $28_0$-$28_N$ to the second disk surface 24B as shown in FIG. 3B.

The concentric servo sectors $26_0$-$26_N$ may be recorded on the first disk surface 24A using any suitable technique. In one embodiment, the disk is installed into a head disk assembly (HDA) of the disk drive and then the concentric servo sectors $26_0$-$26_N$ are written to the first disk surface 24A using an external servo writer. In another embodiment, a media writer writes the concentric servo sectors $26_0$-$26_N$ to the first disk surface 24A, and then the disk is installed into the HDA of a disk drive. In yet another embodiment, the concentric servo sectors $26_0$-$26_N$ may be recorded to the first disk surface 24A using a magnetic printing technique.

Figure 3C:
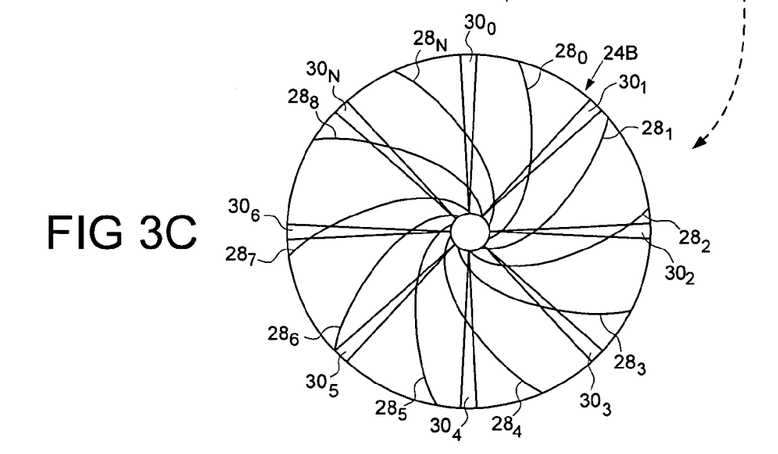

In one embodiment, after writing the spiral servo tracks $28_0$-$28_N$ to the second disk surface 24B, a plurality of concentric servo sectors $30_0$-$30_N$ are written to the second disk surface 24B (FIG. 3C) in response to the spiral servo tracks $28_0$-$28_N$. Further details of how the concentric servo sectors $30_0$-$30_N$ are written in response to the spiral servo tracks $28_0$-$28_N$ are provided below with reference to FIG. 9.

Figure 4:
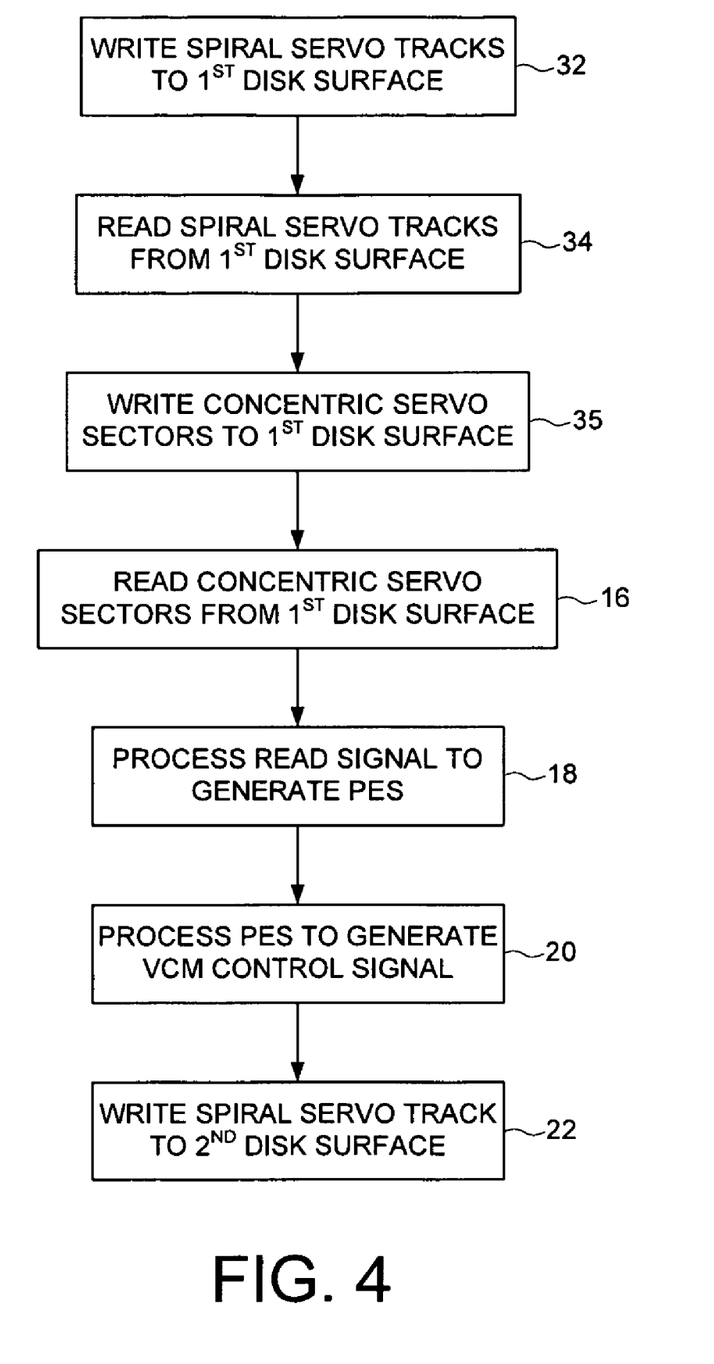
FIG. 4 is a flow diagram according to an embodiment of the present invention wherein spiral servo tracks on a first disk surface are processed to write concentric servo sectors on the first disk surface, and then the concentric servo sectors are processed to write spiral servo tracks to a second disk surface.

FIG. 4 shows a flow diagram according to an embodiment of the present invention which is an extension of the flow diagram of FIG. 2, wherein spiral servo tracks are written to a first disk surface (step 32). The spiral servo tracks may be written using any suitable technique, such as with an external spiral servo writer, media writer, or magnetic printing technique. The spiral servo tracks are then read from the first disk surface (step 34) in order to write concentric servo sectors to the first disk surface (step 35). The concentric servo sectors on the first disk surface are then processed to write spiral servo tracks to a second disk surface (steps 16-22).

Figure 5A:
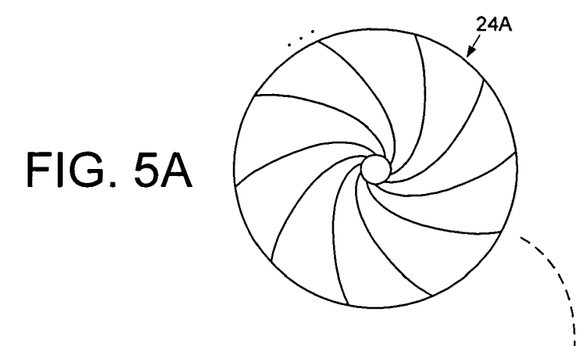
FIGS. 5A-5D illustrate the flow diagram of FIG. 4.
Figure 5B:
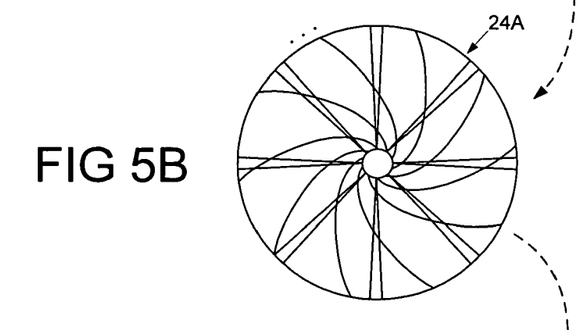
Figure 5C:
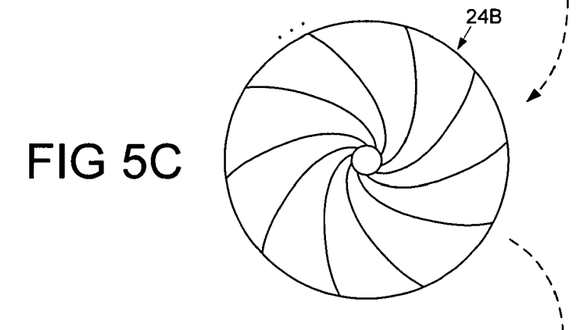
Figure 5D:
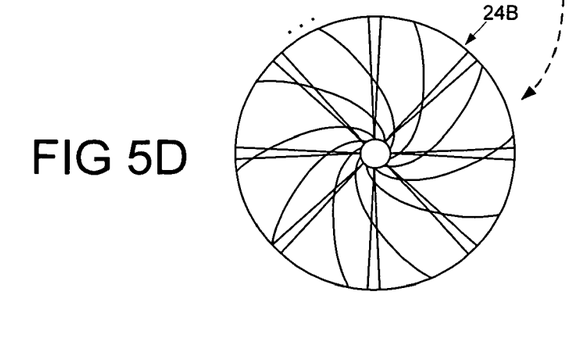

FIG. 5A illustrates an embodiment of the present invention wherein a plurality of spiral servo tracks are written to a first disk surface 24A which are then processed in order to write a plurality of concentric servo sectors to the first disk surface (FIG. 5B). Thereafter, the concentric servo sectors on the first disk surface 24A are processed to write a plurality of spiral servo tracks to a second disk surface (FIG. 5C). The spiral servo tracks on the second disk surface 24B are then processed to write a plurality of concentric servo sectors on the second disk surface (FIG. 5D).

Figure 6A:
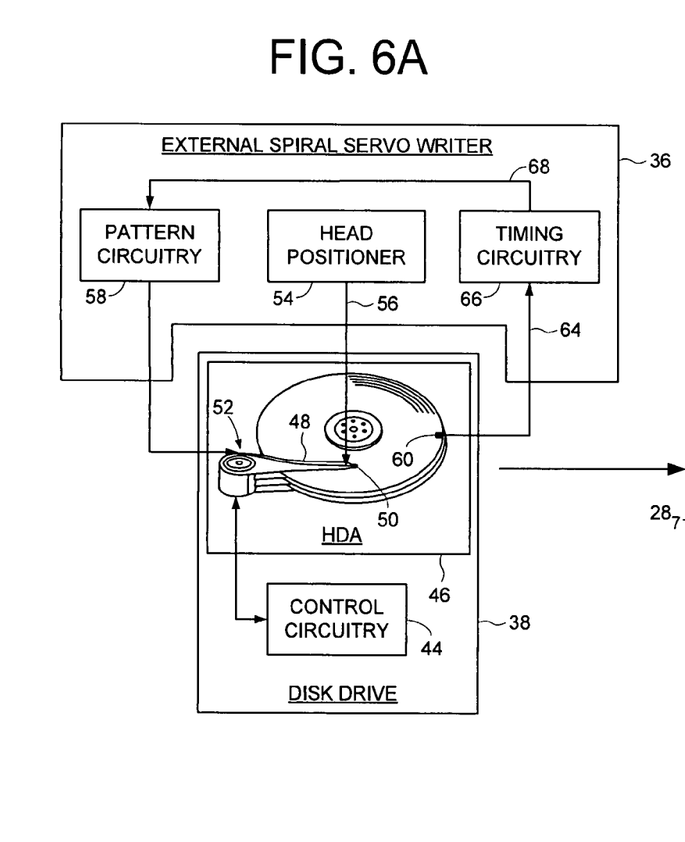
FIG. 6A shows an external spiral servo writer for writing spiral servo tracks to the disk according to an embodiment of the present invention.
Figure 8A:
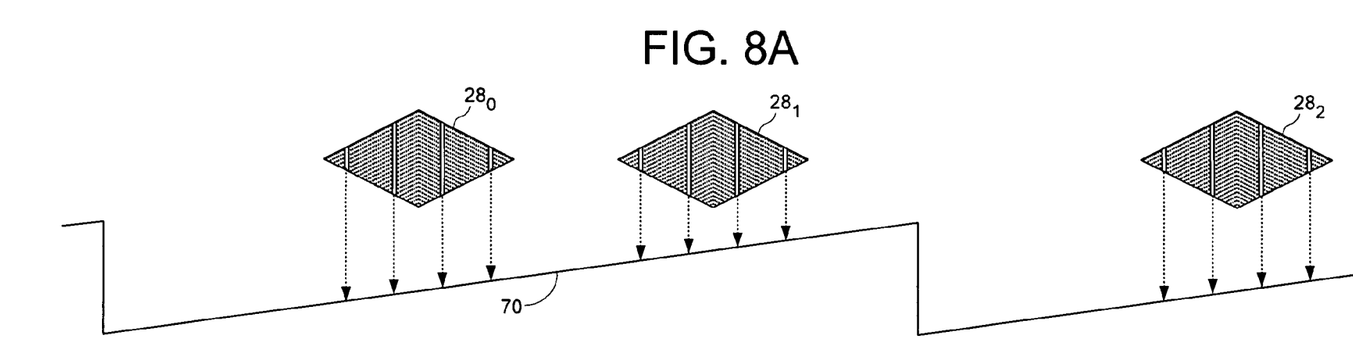
FIG. 8A shows an embodiment of the present invention wherein a servo write clock is synchronized by clocking a modulo-N counter relative to when the sync marks in the spiral servo tracks are detected.
Figure 8B:
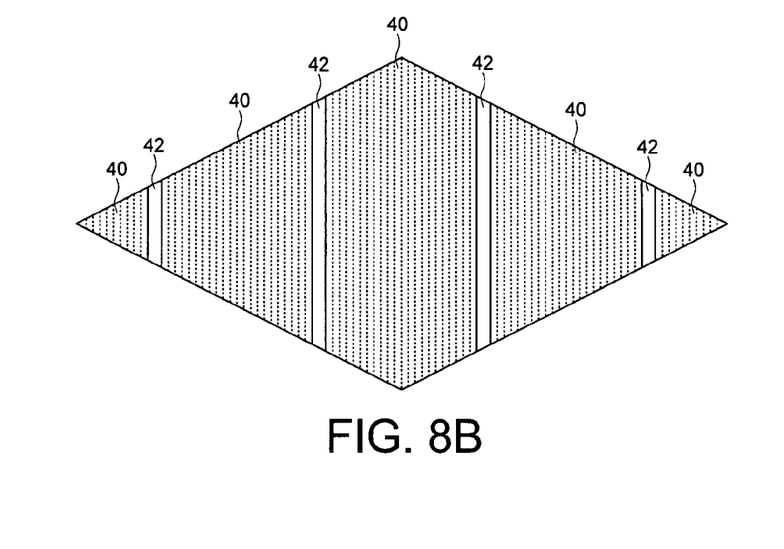
FIG. 8B shows an envelope generated by reading the spiral servo track, including the sync marks in the spiral servo track.

FIG. 6A shows an embodiment of the present invention wherein an external spiral servo writer 36 is used to write a plurality of spiral servo tracks $28_0$-$28_N$ to a first disk surface 24A of a disk drive 38, wherein each spiral servo track $28_i$ comprises a high frequency signal 40 interrupted by a sync mark 42 at a sync mark interval (FIG. 8B). The disk drive 38 comprises control circuitry 44 and a head disk assembly (HDA) 46 comprising the disk, an actuator arm 48, a head 50 coupled to a distal end of the actuator arm 48, and a voice coil motor 52 for rotating the actuator arm 48 about a pivot to position the head 50 radially over the disk. In one embodiment, a write clock is synchronized to the rotation of the disk, and the plurality of spiral servo tracks $28_0$-$28_N$ are written on the disk at a predetermined circular location determined from the write clock.

The external spiral servo writer 36 comprises a head positioner 54 for actuating a head positioning pin 56 using sensitive positioning circuitry, such as a laser interferometer. While the head positioner 56 moves the head 50 at a predetermined velocity over the stroke of the actuator arm 48, pattern circuitry 58 generates the data sequence written to the disk for a spiral servo track 28. The external spiral servo writer 36 inserts a clock head 60 into the HDA 46 for writing a clock track 62 (FIG. 6B) at an outer diameter of the disk. The clock head 60 then reads the clock track 62 to generate a clock signal 64 processed by timing recovery circuitry 66 to synchronize the write clock 68 for writing the spiral servo tracks $28_0$-$28_N$ to the disk. The timing recovery circuitry 66 enables the pattern circuitry 58 at the appropriate time relative to the write clock 68 so that the spiral servo tracks $28_0$-$28_N$ are written at the appropriate circular location. The timing recovery circuitry 66 also enables the pattern circuitry 58 relative to the write clock 68 to write the sync marks 42 (FIG. 8B) within the spiral servo tracks $28_0$-$28_N$ at the same circular location from the outer diameter to the inner diameter of the disk. As described below with reference to FIG. 9, the constant interval between sync marks 42 (independent of the radial location of the head 50) enables the servo write clock to maintain synchronization while writing the concentric servo sectors to the disk.

Figure 6B:
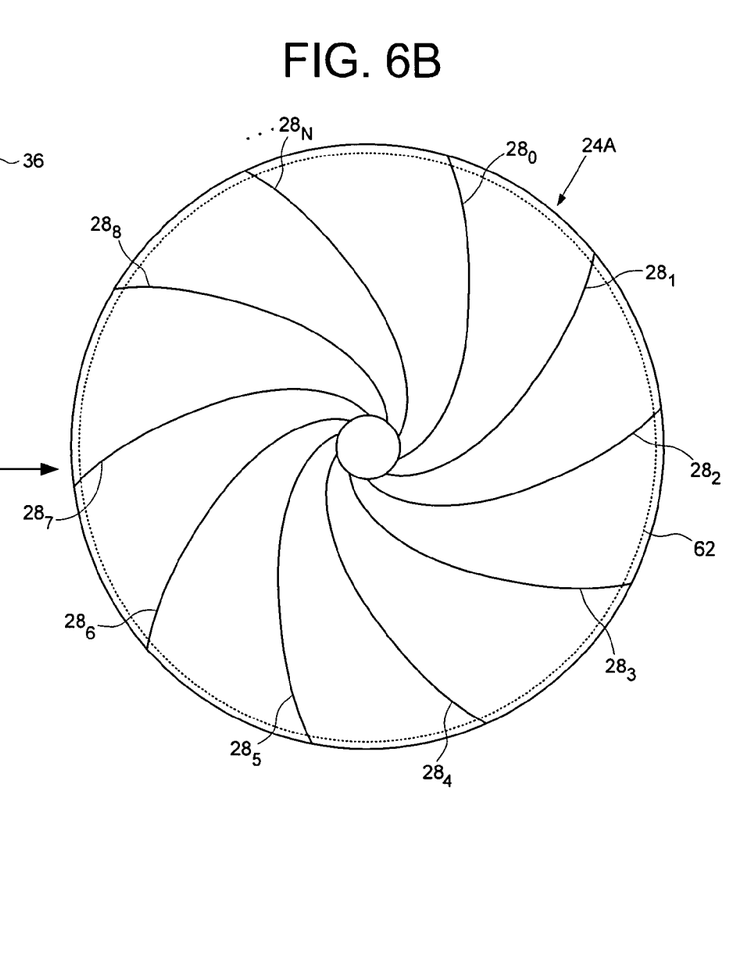
FIG. 6B shows spiral servo tracks written to the disk over a partial disk revolution according to an embodiment of the present invention.
Figure 7A:
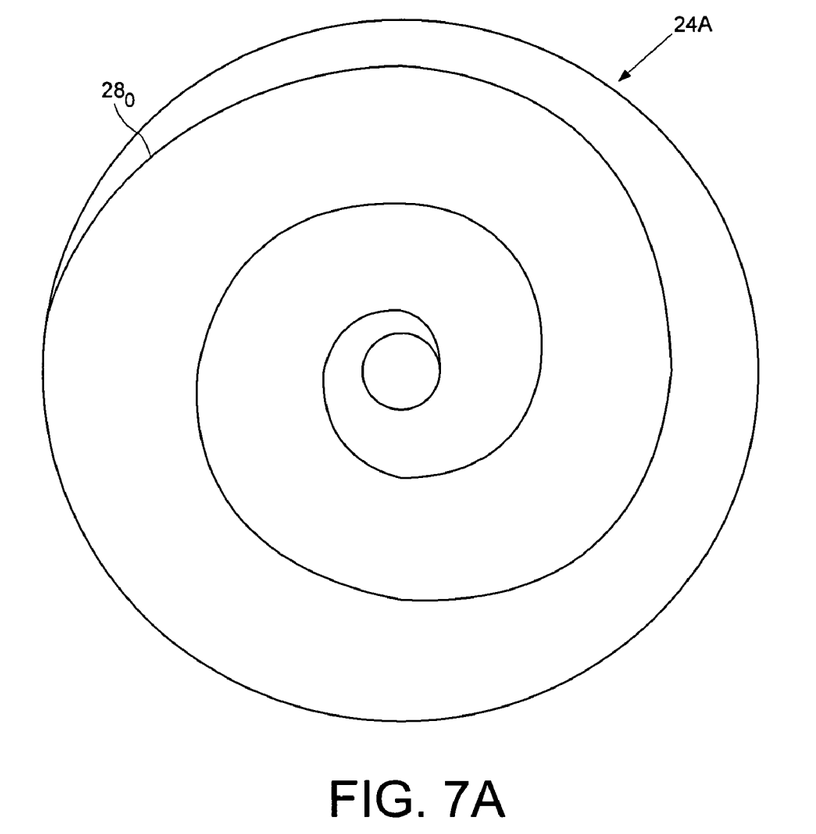
FIG. 7A illustrates an embodiment of the present invention wherein each spiral servo track is written over multiple revolutions of the disk.
Figure 7B:
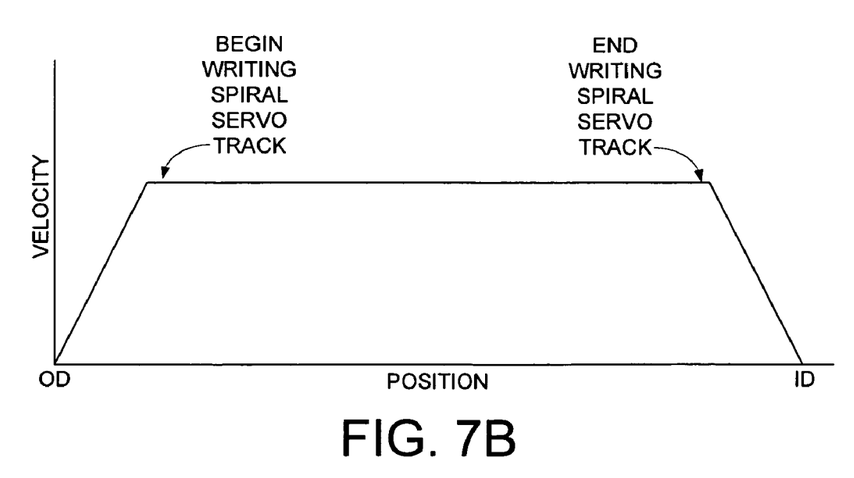
FIG. 7B shows a velocity profile according to an embodiment of the present invention for writing a spiral servo track to a disk.

In the embodiment of FIG. 6B, each spiral servo track $28_i$ is written over a partial revolution of the disk. In an alternative embodiment, each spiral servo track $28_i$ is written over one or more revolutions of the disk. FIG. 7A shows an embodiment wherein each spiral servo track $28_i$ is written over multiple revolutions of the disk. The length of each spiral servo track $28_i$ (and number of revolutions spanned) is determined by the velocity of the actuator arm 48 as controlled by the VCM 52 in response to a velocity profile an example of which is shown in FIG. 7B. A velocity error signal (derivative of the PES) relative to the velocity profile is generated in response to the concentric servo sectors written on the first disk surface 24A.

Referring again to the embodiment of FIG. 6A, after the external spiral servo writer 36 writes the spiral servo tracks $28_0$-$28_N$ to the first disk surface 24A, the head positioning pin 56 and clock head 60 are removed from the HDA 46 and the concentric servo sectors are written to the first disk surface 24A during a "fill operation". In one embodiment, the control circuitry 44 within the disk drive 38 is used to process the spiral servo tracks $28_0$-$28_N$ in order to write the concentric servo sectors. In an alternative embodiment, an external concentric servo writer is used to process the spiral servo tracks $28_0$-$28_N$ in order to write the concentric servo sectors to the first disk surface 24A.

FIG. 8B illustrates an envelope of the read signal as the head 50 passes over a spiral servo track $28_i$. The read signal representing the spiral servo track comprises high frequency transitions 40 interrupted by sync marks 42. When the head 50 moves in the radial direction, the envelope will shift (left or right) while the sync marks 42 remain fixed. The shift in the envelope (detected from the high frequency signal 40) relative to the sync marks 42 provides the off-track information (position error signal or PES) for servoing the head 50.

FIG. 8A shows an embodiment of the present invention wherein a saw-tooth waveform 70 is generated by clocking a modulo-N counter with the servo write clock, wherein the frequency of the servo write clock is adjusted until the sync marks 42 in the spiral servo tracks $28_0$-$28_N$ are detected at a target modulo-N count value. The servo write clock may be generated using any suitable circuitry, such as a phase locked loop (PLL). As each sync mark 42 in the spiral servo tracks $28_0$-$28_N$ is detected, the value of the modulo-N counter represents the phase error for adjusting the PLL. In one embodiment, the PLL is updated when any one of the sync marks 42 within the envelope is detected. In this manner the multiple sync marks 42 in each envelope (each spiral servo track crossing) provides redundancy so that the PLL is still updated if one or more of the sync marks 42 are missed due to noise in the read signal. Once the sync marks 42 are detected at the target modulo-N counter values, the servo write clock is coarsely locked to the desired frequency for writing concentric servo sectors to the disk.

In one embodiment, the servo write clock is further synchronized by generating a timing recovery measurement from the high frequency signal 40 between the sync marks 42 in the spiral servo tracks $28_0$-$28_N$. Synchronizing the servo write clock to the high frequency signal 40 helps maintain proper radial alignment (phase coherency) of the Gray coded track addresses in the concentric servo sectors. The timing recovery measurement may be generated in any suitable manner. In one embodiment, the servo write clock is used to sample the high frequency signal 40 and the signal sample values are processed to generate the timing recovery measurement. The timing recovery measurement adjusts the phase of the servo write clock (PLL) so that the high frequency signal 40 is sampled synchronously. In this manner, the sync marks 42 provide a coarse timing recovery measurement and the high frequency signal 40 provides a fine timing recovery measurement for maintaining synchronization of the servo write clock.

Figure 9:
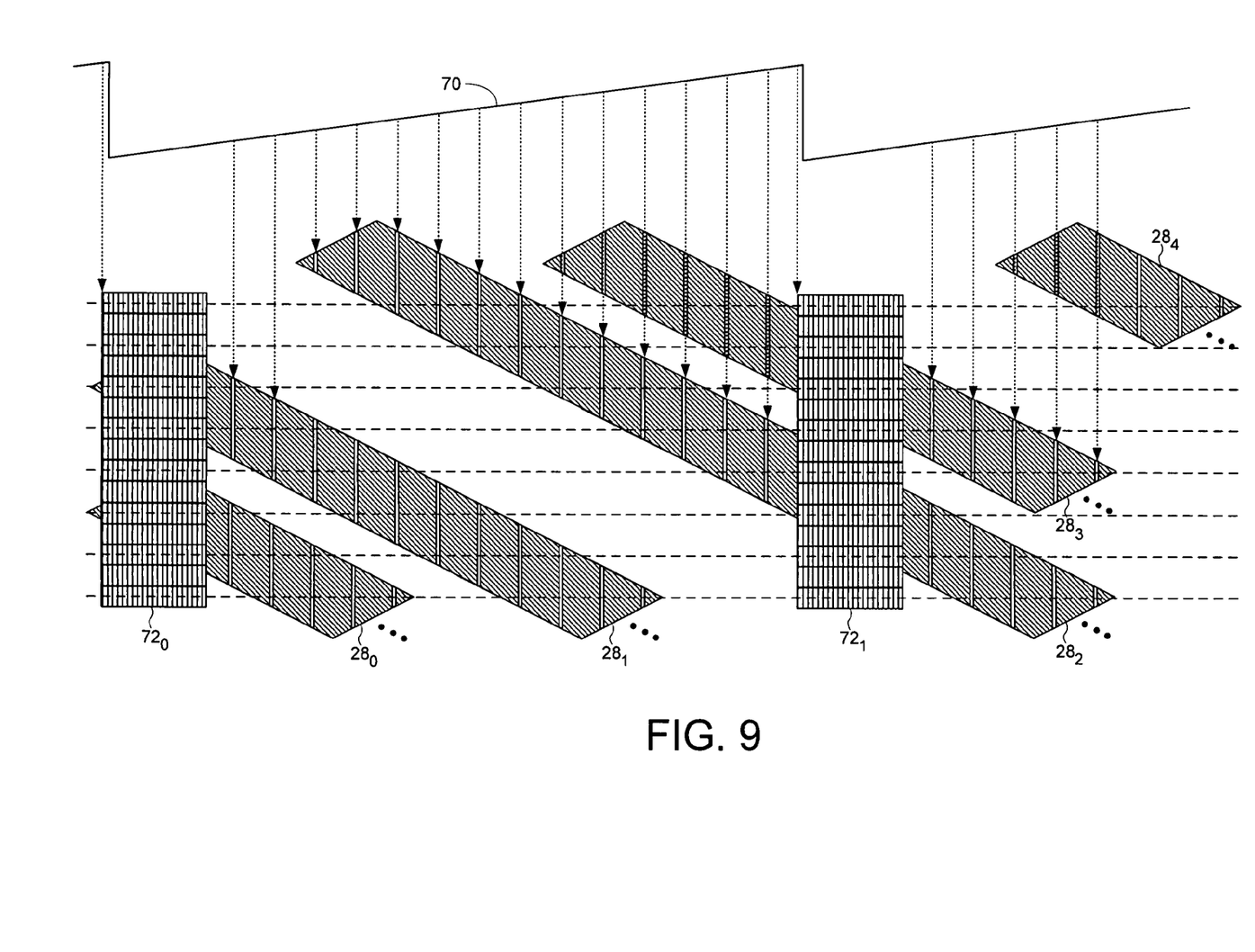
FIG. 9 illustrates writing of concentric servo sectors using a servo write clock generated from reading the spiral servo tracks.

FIG. 9 illustrates how concentric servo sectors $72_0$-$72_N$ are written to a disk surface after synchronizing the servo write clock in response to the high frequency signal 40 and the sync marks 42 in the spiral servo tracks $28_0$-$28_N$. In the embodiment of FIG. 9, the dashed lines represent the centerlines of the data tracks. The sync marks in the spiral servo tracks $28_0$-$28_N$ may be written so that there is a shift of two sync marks 42 in the envelope (FIG. 8B) between data tracks. In an alternative embodiment, the sync marks 42 in the spiral servo tracks $28_0$-$28_N$ are written so that there is a shift of N sync marks in the envelope between data tracks. In the embodiment of FIG. 9, the data tracks are narrower than the spiral servo tracks 28, however, in an alternative embodiment the data tracks are wider than or proximate the width of the spiral servo tracks $28_i$.

Once the head 50 is tracking on a servo track, the concentric servo sectors $72_0$-$72_N$ are written to the disk surface using the servo write clock. Write circuitry is enabled when the modulo-N counter reaches a predetermined value, wherein the servo write clock clocks the write circuitry to write the concentric servo sector 72 to the disk surface. The spiral servo tracks $28_0$-$28_N$ on the disk are processed in an interleaved manner to account for the concentric servo sectors $72_0$-$72_N$ overwriting a spiral servo track. For example, when writing the concentric servo sectors $72_1$ to the disk, spiral servo track $28_2$ is processed initially to generate the PES tracking error and the timing recovery measurement. When the concentric servo sectors $72_1$ begin to overwrite spiral servo track $28_2$, spiral servo track $28_3$ is processed to generate the PES tracking error and the timing recovery measurement. In the embodiment of FIG. 9, the spiral servo tracks 28 are written as pairs to facilitate the interleave processing; however, the spiral servo tracks may be written using any suitable spacing (e.g., equal spacing) while still implementing the interleaving aspect. In other embodiments, the disk comprises only one set of spiral servo tracks $28_0$-$28_N$ all of which are processed to servo the head (except the spiral servo track being overwritten).

Figures 10A, 10B, 10C:
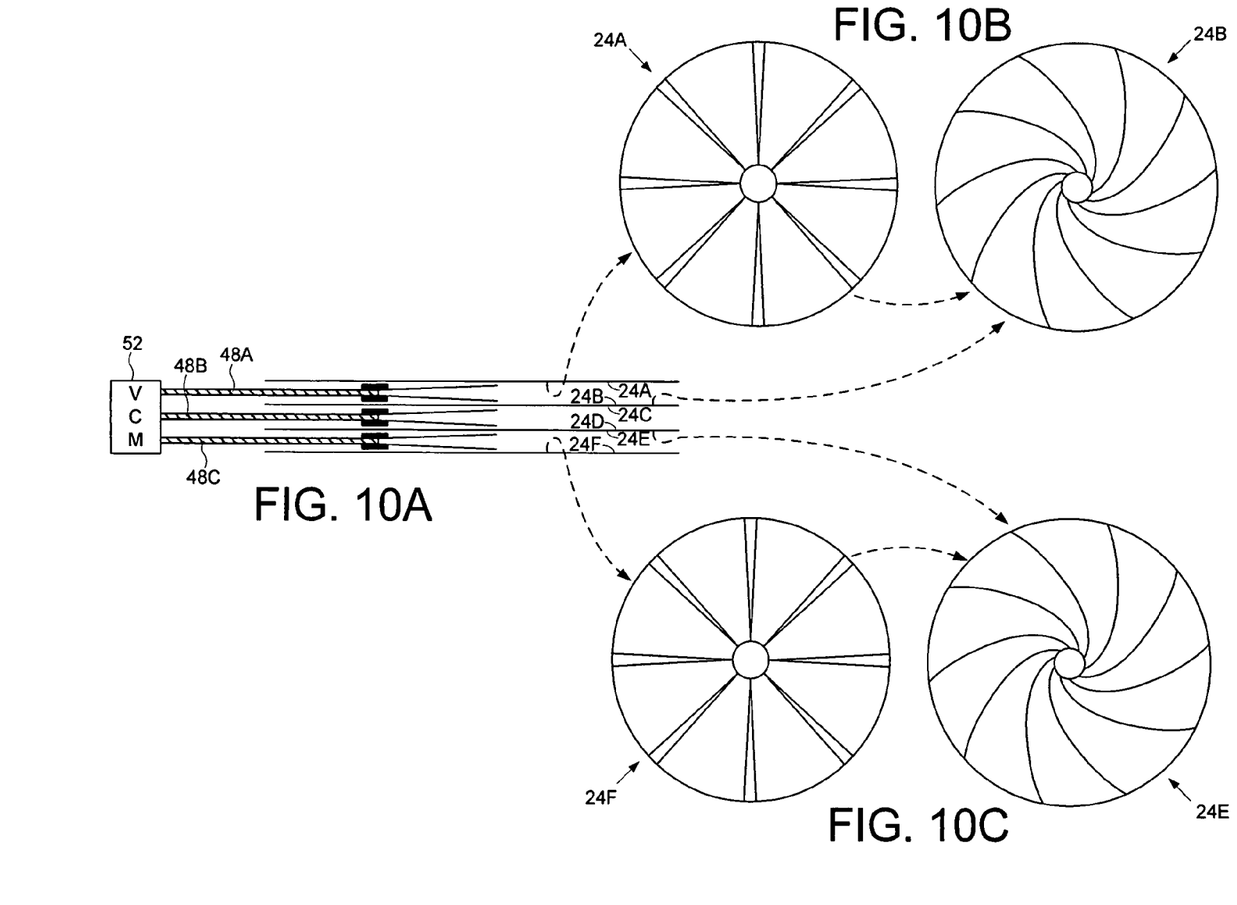
FIGS. 10A-10C illustrate an embodiment of the present invention wherein a first head connected to an actuator arm is used to read concentric servo sectors while a second head connected to the same actuator arm is used to write spiral servo tracks to a second disk surface.

FIG. 10A illustrates an embodiment of the present invention wherein the disk drive comprises a plurality of disk surfaces 24A-24F, and a plurality of actuator arms 48A-48C having heads for accessing each disk surface 24A-24F. In one embodiment, one of the disk surfaces corresponding to an actuator arm is written with concentric servo sectors used to write spiral servo tracks to the other disk surface corresponding to the actuator arm. For example in FIG. 10B, disk surface 24A is written with concentric servo sectors that are used to write spiral servo tracks to disk surface 24B. The spiral servo tracks are then processed to write concentric servo sectors to disk surface 24B. In FIG. 10C, disk surface 24F is written with concentric servo sectors that are used to write spiral servo tracks to disk surface 24E. The spiral servo tracks are then processed to write concentric servo sectors to disk surface 24E.

Figure 11:
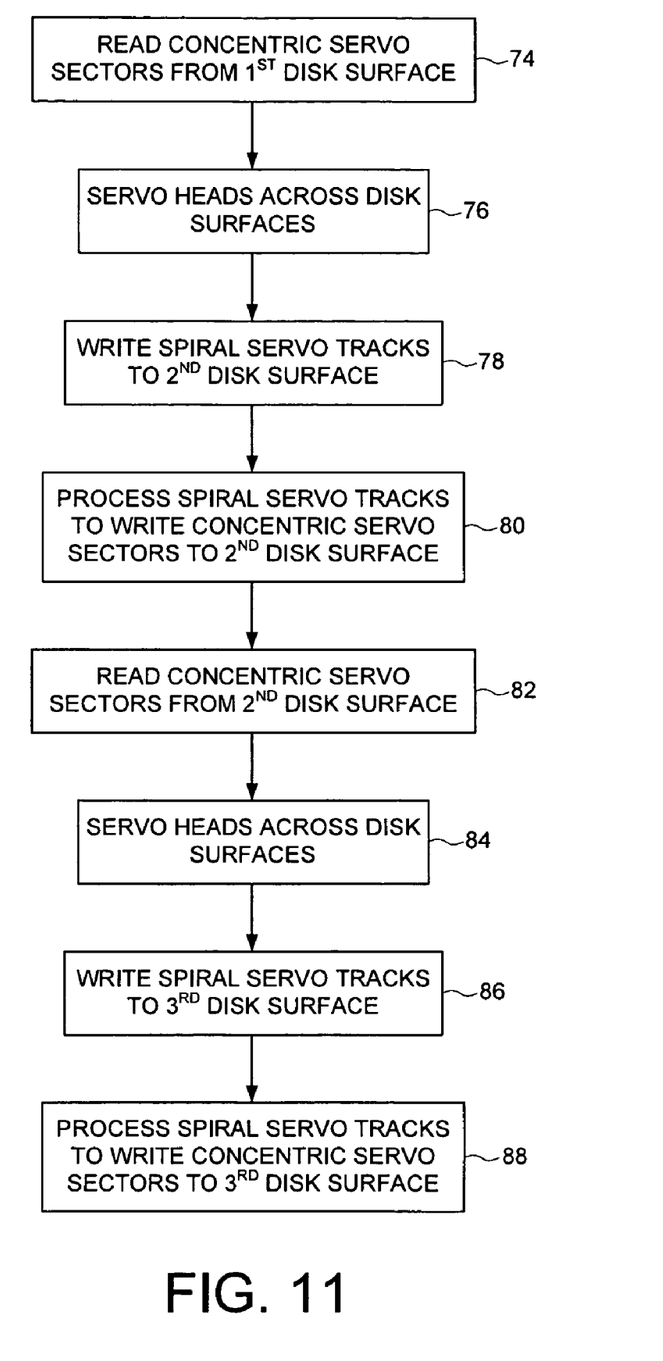
FIG. 11 is a flow diagram according to an embodiment of the present invention wherein spiral servo tracks are propagated across multiple disk surfaces in a daisy chain fashion.

FIG. 11 shows a flow diagram according to another embodiment of the present invention wherein the spiral servo tracks are propagated in a daisy chain fashion. Concentric servo sectors written to a first disk surface are read (step 74) in order to servo the heads across the disk surfaces (step 76) while writing spiral servo tracks to a second disk surface (step 78). The spiral servo tracks are processed to write concentric servo sectors to the second disk surface (step 80). The concentric servo sectors are read from the second disk surface (step 82) in order to servo the heads across the disk surfaces (step 84) while writing spiral servo tracks to a third disk surface (step 86). The spiral servo tracks are processed to write concentric servo sectors to the third disk surface (step 88). This daisy chain process repeats for any suitable number of disk surfaces, and in one embodiment, there may be multiple daisy chains corresponding to different sequences of disk surfaces.

The heads may be servoed in response to concentric servo sectors written on one of the disk surfaces in any suitable manner when writing spiral servo tracks to another disk surface. In one embodiment, the servo algorithm for seeking the heads across the disk surfaces during normal operation is used to servo the heads while writing a spiral servo track. For example, the normal seek algorithm may control the velocity of the VCM relative to a velocity profile such as shown in FIG. 7B.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a first disk surface and a second disk surface, wherein the first disk surface comprises a plurality of concentric servo sectors extending across substantially an entire radius of the first disk surface;
    a first head actuated over the first disk surface and a second head actuated over the second disk surface;

a voice coil motor (VCM) for actuating the first and second heads radially over the respective disk surfaces; and control circuitry operable to:
- read the concentric servo sectors across substantially the entire radius of the first disk surface using the first head to generate a read signal;
- process the read signal to generate a position error signal (PES) representing a radial location of the first head relative to the first disk surface; and
- process the PES to generate a control signal applied to the VCM to move the second head radially over the second disk surface while writing a spiral servo track on the second disk surface.

2. The disk drive as recited in claim 1, wherein the control circuitry is further operable to write a plurality of spiral servo tracks to the second disk surface in response to the concentric servo sectors on the first disk surface.

3. The disk drive as recited in claim 2, further comprising a third disk surface, wherein the control circuitry is further operable to write a plurality of spiral servo tracks to the third disk surface in response to the concentric servo sectors on the first disk surface.

4. The disk drive as recited in claim 3, wherein the control circuitry is further operable to concurrently write the plurality of spiral servo tracks to the second disk surface and write the plurality of spiral servo tracks to the third disk surface in response to the concentric servo sectors on the first disk surface.

5. The disk drive as recited in claim 1, wherein the control circuitry is further operable to write concentric servo sectors to the second disk surface in response to the spiral servo track on the second disk surface.

6. The disk drive as recited in claim 1, wherein the control circuitry is further operable to write the concentric servo sectors on the first disk surface.

7. The disk drive as recited in claim 6, wherein the control circuitry is further operable to write the concentric servo sectors on the first disk surface in response to a plurality of spiral servo tracks on the first disk surface.

8. The disk drive as recited in claim 1, wherein the control circuitry is further operable to:
- estimate a velocity of the VCM in response to the PES; and
- compare the estimated velocity to a target velocity of a velocity profile.

9. The disk drive as recited in claim 1, further comprising:
- a third disk surface and a fourth disk surface, wherein the third disk surface comprises a plurality of concentric servo sectors extending across substantially an entire radius of the third disk surface;
- a third head actuated over the third disk surface and a fourth head actuated over the fourth disk surface;
- a first actuator arm coupled to the VCM operable to actuate the first head over the first disk surface and the second head over the second disk surface; and
- a second actuator arm coupled to the VCM operable to actuate the third head over the third disk surface and the fourth head over the fourth disk surface;
- wherein the control circuitry is further operable to write at least one spiral servo track to the fourth disk surface in response to the concentric servo sectors on the third disk surface.

10. The disk drive as recited in claim 1, further comprising a third disk surface, wherein the control circuitry is further operable to:
- write concentric servo sectors to the second disk surface in response to the spiral servo track on the second disk surface; and
- write a spiral servo track on the third disk surface in response to the concentric servo sectors on the second disk surface.

11. A method of writing a spiral servo track in a disk drive, the disk drive comprising:
- a first disk surface and a second disk surface, wherein the first disk surface comprises a plurality of concentric servo sectors extending across substantially an entire radius of the first disk surface;
- a first head actuated over the first disk surface and a second head actuated over the second disk surface;
- a voice coil motor (VCM) for actuating the first and second heads radially over the respective disk surfaces; and the method comprising:
- reading the concentric servo sectors across substantially the entire radius of the first disk surface using the first head to generate a read signal;
- processing the read signal to generate a position error signal (PES) representing a radial location of the first head relative to the first disk surface; and
- processing the PES to generate a control signal applied to the VCM to move the second head radially over the second disk surface while writing a spiral servo track on the second disk surface.

12. The method as recited in claim 11, further comprising writing a plurality of spiral servo tracks to the second disk surface in response to the concentric servo sectors on the first disk surface.

13. The method as recited in claim 12, wherein the disk drive further comprises a third disk surface, the method further comprising writing a plurality of spiral servo tracks to the third disk surface in response to the concentric servo sectors on the first disk surface.

14. The method as recited in claim 13, further comprising concurrently writing the plurality of spiral servo tracks to the second disk surface and writing the plurality of spiral servo tracks to the third disk surface in response to the concentric servo sectors on the first disk surface.

15. The method as recited in claim 11, further comprising writing concentric servo sectors to the second disk surface in response to the spiral servo track on the second disk surface.

16. The method as recited in claim 11, further comprising writing the concentric servo sectors on the first disk surface.

17. The method as recited in claim 16, further comprising writing the concentric servo sectors on the first disk surface in response to a plurality of spiral servo tracks on the first disk surface.

18. The method as recited in claim 11, further comprising:
- estimating a velocity of the VCM in response to the PES; and
- comparing the estimated velocity to a target velocity of a velocity profile.

19. The method as recited in claim 11, wherein the disk drive further comprises:
- a third disk surface and a fourth disk surface, wherein the third disk surface comprises a plurality of concentric servo sectors extending across substantially an entire radius of the third disk surface;
- a third head actuated over the third disk surface and a fourth head actuated over the fourth disk surface;
- a first actuator arm coupled to the VCM operable to actuate the first head over the first disk surface and the second head over the second disk surface; and a second actuator arm coupled to the VCM operable to actuate the third head over the third disk surface and the fourth head over the fourth disk surface;

wherein the method further comprises writing at least one spiral servo track to the fourth disk surface in response to the concentric servo sectors on the third disk surface.

20. The method as recited in claim 11, wherein the disk drive further comprises a third disk surface, the method further comprising:

writing concentric servo sectors to the second disk surface in response to the spiral servo track on the second disk surface; and writing a spiral servo track on the third disk surface in response to the concentric servo sectors on the second disk surface.

* * * * *